Sept. 14, 1965            G. KIPER            3,205,805
SHUTTER ASSEMBLY FOR CAMERAS
Filed Aug. 2, 1962
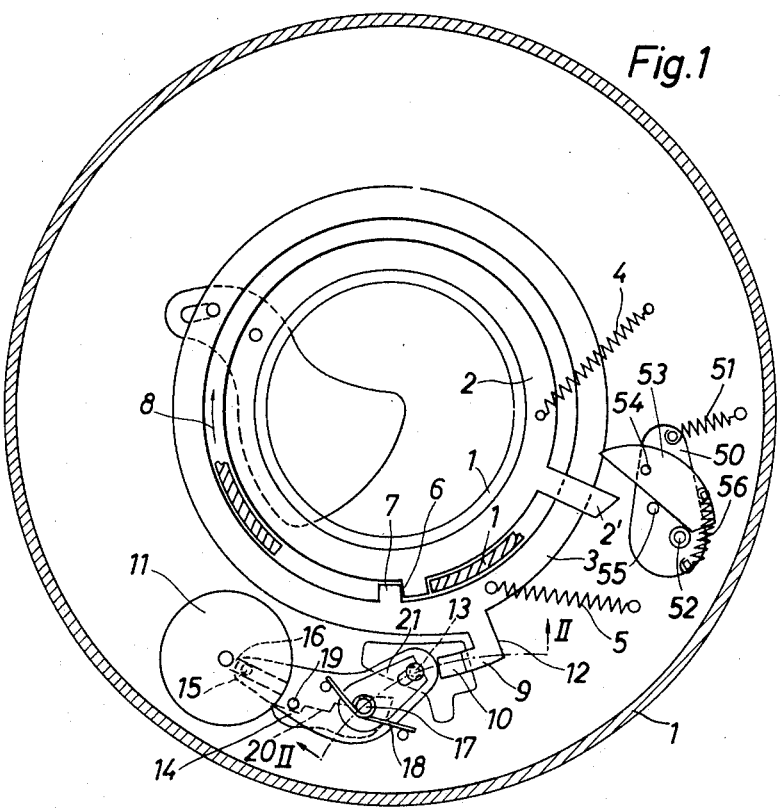
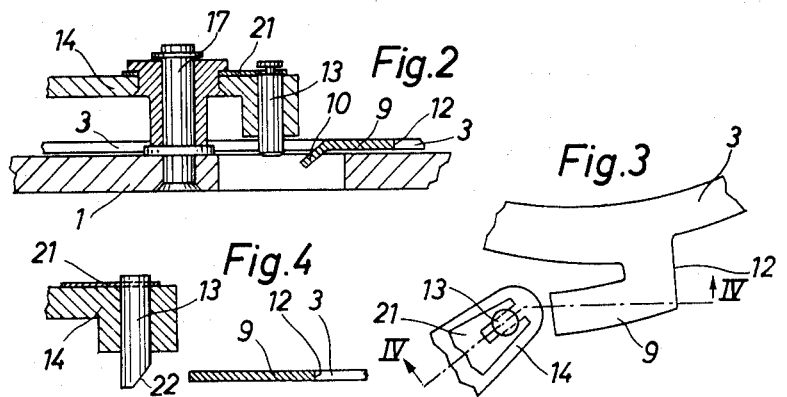
INVENTOR.
GERD KIPER

United States Patent Office 3,205,805
Patented Sept. 14, 1965

3,205,805
SHUTTER ASSEMBLY FOR CAMERAS
Gerd Kiper, Unterhaching, near Munich, Germany, assignor to Agfa Aktiengesellschaft, Leverkusen, Germany
Filed Aug. 2, 1962, Ser. No. 214,389
Claims priority, application Germany, Aug. 30, 1961, A 38,208
9 Claims. (Cl. 95—63)

The present invention relates to cameras.

More particularly, the present invention relates to shutter assemblies of cameras and especially to the structure for driving a camera shutter and for retarding the drive so as to provide a desired, preselected exposure time.

With conventional shutters, when the shutter is cocked the retarding mechanism comes into operative engagement with the shutter, and usually a spring is relied upon for placing the retarding structure in operative engagement with the shutter driving structure. For practical reasons this spring is relatively weak, so that as a result if the shutter is operated very quickly it may happen that the retarding mechanism does not arrive at its proper operative position relative to the shutter drive structure with the result that an improper exposure time is produced. Moreover, such a relatively weak spring will often move part of the retarding structure into engagement with the shutter driving structure in such a way that the retarding structure will rebound a few times from the shutter driving structure so that if the shutter is released during one of these rebounding movements of the retarding structure there will again be an improper exposure time.

It is accordingly a primary object of the present invention to provide in a structure of the above type an arrangement according to which the preselected exposure time will be precisely provided no matter how rapidly the shutter is actuated by the operator and without any possibility of inaccuracies resulting from rebounding or the like which is reliably avoided with the structure of the invention.

Another object of the present invention is to provide a structure which will overcome the above drawbacks by providing precise exposure time under all conditions of operation particularly with that type of shutter which is automatically released to make an exposure immediately after the cocking operations are performed by the camera operator.

It is also an object of the present invention to provide a structure capable of accomplishing the above objects and at the same time being relatively simple and compact as well as operating reliably to produce the desired results.

With the above objects in view the invention includes, in combination, a shutter blade means and a drive means for driving the shutter blade means as well as a retarding means for retarding the drive means so as to provide a selected exposure time. The drive means and retarding means respectively include a drive member and a retarding member, and one of these members has a connecting portion while, in accordance with the present invention, the other of these members carries a resilient or springy projection means which cooperates with the connecting portion for placing the retarding means and the drive means in operative engagement with each other.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a view in a plane normal to the optical axis showing in part a shutter assembly provided with the structure of the invention, part of the structure being shown in FIG. 1 in section and fragmentarily as well as diagrammatically;

FIG. 2 is a sectional view taken along line II—II of FIG. 1 in the direction of the arrows;

FIG. 3 shows in a plan view and on an enlarged scale as compared to FIG. 1 another embodiment of a structure according to the present invention; and FIG. 4 is a sectional view taken along line IV—IV of FIG. 3 in the direction of the arrows.

Referring to FIG. 1, it will be seen that the shutter housing 1 forms a support means supporting for rotary movement a pair of shutter rings 2 and 3 which form a drive means for driving the shutter blades one of which is shown in FIG. 1. The shutter blade means is shown in FIG. 1 as including only one blade for the sake of clarity since those skilled in the art will know that a plurality of blades are distributed in a well known manner about the optical axis with the particular type of shutter shown in FIG. 1, although it is to be understood that the invention is also applicable to other types of shutters, even those which include a single shutter blade. The drive rings 2 and 3 turn together during cocking of the shutter so that the shutter blades remain in their closed position, and then when an exposure is made the ring 2 first returns to its starting position and then after a given period of time, which determines the exposure time, the trailing ring 3 returns to its starting position so as to again close the shutter, as is well known with this type of shutter. As is shown for the one blade which is illustrated in FIG. 1, the several shutter blades are pivotally connected to the leading ring 2 and have a pin-and-slot connection with the trailing ring 3. A tubular portion of the housing 1 supports the rings 2 and 3 for rotary movement. A spring 4 is connected to the leading ring 2 for urging the latter to the illustrated starting position thereof where a projection 6 of the ring 2 engages an end of a slot formed in a tubular portion of the housing 1, and a spring 5 acts on the trailing shutter drive ring 3 for urging the latter to the illustrated rest position where the projection 7 thereof engages the projection 6 of the leading ring 2.

The manually operable structure for cocking and releasing the shutter is diagrammatically shown at the right portion of FIG. 1. This structure includes a lever 50 which is supported for turning movement by the pivot pin 52 and which is urged in a clockwise direction, as viewed in FIG. 1, by the spring 51 to the illustrated rest position where the lever 50 engages any suitable stop. The structure which is capable of turning the lever 50 in opposition to the spring 51 in a counterclockwise direction is not illustrated in the drawing and is of course accessible to the operator. The lever 50 has a pivot pin 54 on which a swing member 53 is pivotally supported so that the member 53 must turn with the lever 50 while being turnable with respect thereto about the pivot pin 54, and a spring 56 urges the swing member 53 to turn about the pin 54 in a clockwise direction, as viewed in FIG. 1, to the illustrated position where the swing member 53 engages the stop pin 55 which is also fixedly carried by the lever 50.

The shutter ring 2 has a radial projection 2' which is located in the path of turning movement of the swing member 53 when the latter is turned together with the lever 50 by the operator in opposition to the spring 51. Thus, when the operator wishes to make an exposure he will turn the lever 50 in a counterclockwise direction about the pin 52 in opposition to the spring 51, and the swing member 53 will engage the projection 2' and will turn the shutter ring 2 in opposition to the spring 4 in the direction of the arrow 8 shown in FIG. 1. The turning of the ring 2 will be transmitted through its projection 6 and through the projection 7 to the ring 3 which will thus also turn with the ring 2, and the ring 3 of course turns in opposition to the spring 5 so that the springs 4 and 5 are tensioned at this time while both of the shutter rings 2 and 3 turn as a unit in the direction of the arrow 8 so that the blades do not move with respect to each other and the shutter remains closed. This cocking of the shutter continues until the tip of the swing member 53 located at the point thereof which is closest to the optical axis rides off the tip of the projection 2', this latter tip being located at the part of the projection 2' which is most distant from the optical axis. At the moment when the tip of the swing member 53 thus rides off the tip of the projection 2' the leading shutter ring 2 is released to the force of the spring 4 which returns the shutter ring 2 to the illustrated starting position thereof, but the retarding means which is described below prevents the trailing ring 3 from following the ring 2 at this time so that the shutter blades turn to open the shutter, as a result of the relative turning of the ring 2 with respect to the ring 3. The retarding means restrains the ring 3 against return movement for a period of time which has been selected by the operator, and after this selected period of time has elapsed the retarding means will automatically release the ring 3 to the spring 5 which returns the ring 3 to the illustrated position so that the blades again turn back to their closed position and the exposure is completed. When the operator releases the lever 50 the spring 51 returns it to its starting position and during this return movement the swing member 53 can move past the projection 2' as a result of the yieldable turning movement of the swing member 53 made possible by the spring 56, so that during the return of the lever 50 to its starting position the swing member 53 can yield so as to be capable of moving beyond the projection 2', whereupon the spring 56 returns the swing member 53 to its position illustrated in FIG. 1.

With the shutter structure described above and shown in FIG. 1, as well as other types of shutters, the actual exposure-time selection previously made by the operator is not set into the shutter itself until after the operation of the shutter to make an exposure has started. Thus, it is only during operation of the shutter that the structure for controlling the exposure time starts to move to its position relative to the shutter in order to provide the selective exposure time, and as a result if the shutter is actuated too rapidly by the operator it can happen that the exposure-time determining structure does not have an opportunity to properly set itself relative to the shutter driving structure for accurately providing the selected exposure time.

With the structure of the invention, in order to overcome this problem, the ring 3 is provided with a connecting portion 9 which is located in the same plane as the ring 3 and which turns in the plane of the ring 3, this projecting portion 9 being integral with the ring 3. The connecting portion 9 of the ring 3 is substantially L-shaped and terminates in an inclined free end portion 10, as indicated in FIGS. 1 and 2. Thus, in the embodiment of FIGS. 1 and 2 the ring 3 of the shutter drive means forms a drive member which is provided with the illustrated connecting portion 9.

In the illustrated example the retarding means includes the rotary mass 11 and a lever 14 which in a manner described below cooperates with the edge 12 of the connecting portion 9 for retarding the return of the ring 3 to its starting position so as to determine the exposure time. The lever 14 forms a retarding member of the retarding means and this retarding member carries a springy projection means which during cocking of the drive means, when the ring 3 thereof turns in the direction of the arrow 8, has a slidable engagement with the connecting portion 9, and thereafter this springy projection means snaps behind the edge 12 so as to place the retarding means in operative engagement with the shutter drive means. In the illustrated example of FIGS. 1 and 2 the springy projection means is formed by a pin 13 supported in a bore of the lever 14 for sliding movement in a direction perpendicular to the plane of turning of the ring 3 and the connecting portion 9, and the springy projection means further includes the leaf spring 21 which urges the pin 13 down to the position thereof illustrated in FIG. 2.

The lever 14 of the retarding means carries a pin 15 located in a radial slot 16 formed in the under side of the rotary mass 11, and a stationary pin 17 carried by the housing 1 supports the lever 14 for rotary movement about an axis parallel to the optical axis. A wire spring 18 is coiled about the pin 17, engages with one leg a stationary pin carried by the housing 1 and engages with another leg a pin carried by the lever 14 for urging the latter to turn about the pin 17 in a counterclockwise direction, as viewed in FIG. 1. The lever 14 carries a pin 19 which is placed by the spring 18 acting on the lever 14 in engagement with a selected step of a turnable exposure-time setting cam 20 shown in dot-dash lines in FIG. 1. This exposure-time setting cam 20 is turned in a well known manner by the operator so that in accordance with the selected exposure time which is read on a suitable scale the pin 19 will engage a step of the camming edge 20 which is located at a given distance from the optical axis, and in this way the angular position of the lever 14 will be determined. It is to be noted that the free end of the leaf spring 21 is formed with a notch while the upper end of the pin 13 has a portion of reduced diameter located in this notch, so that in this way the leaf spring 21 cooperates with the pin 13 for urging the latter downwardly, as viewed in FIG. 2.

During the cocking of the drive means 2, 3, in the manner described above, the connecting portion 9 of the drive member 3 will reach the springy projection means 21, 13 and the inclined portion 10 of the connecting portion 9 will first engage the pin 13 so that the upper surface of the connecting portion 9 will slide beneath the pin 13 raising the latter in opposition to the leaf spring 21, and this slidable engagement between the springy projection means 21, 13 and the connecting portion 9 of the drive member 3 continues until the edge 12 moves beyond the end of the pin 13 which then snaps behind the edge 12. The edge 12 of the connecting portion 9 will move beyond the pin 13 before the end of the cocking of the shutter. The end of the cocking of the shutter takes place when the tip of the swing member 53 rides off the tip of the projection 2' of the leading ring 2, as described above, so that the spring 4 can return the ring 2 to its starting position in a direction opposite to that indicated by the arrow 8, and in this way the shutter will of course open in order to start the exposure. The spring 5 urges the ring 3 to return to its starting position, but the result at this time is that the edge 12 presses against the pin 13 and turns the lever 14 in opposition to the spring 18 as well as in opposition to the inertia of the mass 11 in a clockwise direction, as viewed in FIG. 1, and the retarding continues until the outer end of the edge 12, most distant from the optical axis, rides past the pin 13 whereupon the spring 5 can immediately return the ring 3 to its starting position, and after the connecting portion 9 turns beyond the pin 13 in a counterclockwise direction, as viewed in FIG. 1, the spring 18 will return the retarding means to its position illustrated in FIG. 1.

The embodiment of the invention which is illustrated in FIGS. 3 and 4 differs from that of FIGS. 1 and 2 only in that the connecting portion 9 is located in its entirety in the same plane as the drive member 3 of the shutter drive means and instead of providing an inclined surface on the connecting portion 9, it is the pin 13 which is provided with an inclined surface 22, shown most clearly in FIG. 4, which during the initial engagement between the pin 13 and the connecting portion 9 enables the pin 13 to slide onto the connecting portion 9 and to have a sliding engagement therewith. Otherwise the embodiment of FIGS. 3 and 4 is identical with that of FIG. 1.

Of course, the invention is not limited to the details described above and shown in the drawing For example, it is possible to provide the springy projection means on the drive member 3 and the connecting portion on the retarding member 14 of the retarding means. Also, the pin 13 could be fixed while the portion 9 could be springy so that due to its inherent resiliency it yields in a direction normal to the plane of turning of the ring 3 to provide the desired cooperation between the retarding means and the shutter drive means. Moreover, the pin 13 could simply be replaced by a projection while the portion 9 could be partly constructed as a pin.

Moreover, the invention is applicable to shutters which operate on principles different from that described above and shown in the drawings. Thus, the invention is also applicable to that type of shutter where during running down of the shutter the shutter ring moves first in one direction and then in an opposite direction. With such a construction the springy projection means and the connecting portion of the pair of members of the drive means and retarding means would slide one with respect to the other during the opening movement of the shutter so as to have their operative engagement by the time the shutter is fully opened and so as to act during the closing of the shutter to provide the selected exposure time. The invention is also applicable even to those types of shutters where it is possible to select the exposure time after the shutter has been cocked, and in all cases the invention will include a springy projection means cooperating with a connecting portion in such a way that these elements engage each other to provide the operative relationship between the retarding means and the shutter drive means during the closing of the shutter. However, the invention is of particular advantage with a structure of the type shown in the drawings and described above where the shutter is automatically released at the end of the cocking movement by riding an element such as swing member 53 off an element such as the projection 2' of the ring 2.

It will be understood that each of the elements described above or two or more together, may also find a useful applications in other types of cameras differing from the types described above.

While the invention has been illustrated and decribed as embodied in camera shutters, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera, in combination, shutter blade means; drive means operatively connected to said shutter blade means for driving the same after said drive means has been cocked, said drive means including a drive member which moves in a given direction during cocking of said drive means; retarding means for retarding said drive means so as to provide a given exposure time during operation of the shutter blade means by said drive means, said retarding means including a retarding member; and springy projection means carried by one of said members and engaging the other of said members during cocking of said drive means for placing said retarding means in operative engagement with said drive means.

2. In a camera, in combination, shutter blade means; drive means operatively connected to said shutter blade means for driving the same after said drive means has been cocked; retarding means for retarding said drive means to provide a given exposure time, said drive means having a driving member which moves in a given direction during cocking of said drive means and said retarding means having a retarding member, and one of said members having a connecting portion; and springy projection means carried by the other of said members and having a sliding engagement with said connecting portion of said one member during movement of said drive means and retarding means one relative to the other during cocking of said drive means preparatory to actuating said shutter blade means to make an exposure, said springy projection means cooperating after said sliding engagement with said connecting portion with the latter for placing said retarding means and said drive means in operative engagement with each other.

3. In a camera, in combination, shutter blade means; drive means operatively connected to said shutter blade means for driving the same after said drive means has been cocked and including a drive member which moves in a given direction during cocking of said drive means; retarding means for retarding said drive means to provide a given exposure time, said retarding means having a retarding member; and springy projection means carried by one of said members and cooperating with the other of said members during cocking of said drive means for placing said retarding means and drive means in operative engagement with each other, said retarding means and drive means moving one relative to the other in a given plane during running down of said retarding means and at the end of the running down of said retarding means placing said springy projection means out of operative engagement with the other of said members, and said springy projection means being resiliently yieldable in a direction perpendicular to said plane.

4. In a camera, in combination, shutter blade means; drive means operatively connected to said shutter blade means for driving the same after said drive means has been cocked and retarding means for retarding said drive means to provide a given exposure time, said drive means and retarding means respectively including a drive member which moves in a given direction during cocking of said drive means and a retarding member and said drive member having a connecting portion; springy projection means carried by said retarding member and having a sliding engagement with said connecting portion of said drive member during cocking of said drive means, said springy projection means after said sliding engagement with said connecting portion snapping behind an edge thereof for placing said retarding means and said drive means in operative engagement with each other.

5. In a camera, in combination, shutter blade means; drive means operatively connected to said shutter blade means for driving the same and retarding means for retarding said drive means to provide a given exposure time, said drive means and retarding means respectively including a drive member and a retarding member and one of said members having a connecting portion; springy projection means carried by the other of said members and having a slidable engagement with said connecting portion of said one member during movement of said drive means relative to said retarding means preparatory to making an exposure, said springy projection means being in the form of a pin extending perpendicularly to the plane in which said drive means and retarding means move with respect to each other, and said pin and said connecting portion respectively having surfaces which slidably engage each other during the initial part of the engagement between said members and at least one of said surfaces being inclined relative to the other to facilitate the slidable engagement of said projection means and connecting portion with each other, said springy projection means snapping behind an edge of said connecting portion at the end of the movement of said drive means relative to said retarding means preparatory to making an exposure for placing said retarding means and drive means in operative engagement with each other.

6. In a camera, in combination, shutter blade means; drive means operatively connected to said shutter blade means for driving the same after said drive means has been cocked, said drive means including a drive member which moves in a given direction during cocking of said drive means; retarding means for retarding said drive means to provide a given exposure time, said retarding means including a retarding member, one of said members having a connecting portion; and springy projection means carried by the other of said members and having sliding engagement with said connecting portion during cocking of said drive means for placing said springy projection means in operative engagement with said connecting portion so as to place said retarding means and drive means in operative engagement with each other.

7. In a camera, in combination, shutter blade means; drive means operatively connected to said shutter blade means for driving the same and including a pair of rotary shutter rings one of which trails the other during running down of said shutter drive means for making the exposure, said drive means including a drive member connected to said one trailing ring; retarding means for retarding said shutter drive means to provide a given exposure time, said retarding means including a retarding member and one of said members having a connecting portion; and springy projection means carried by the other of said members and engaging said connecting portion of said one member for placing said retarding means in operative engagement with said one trailing ring of said drive means.

8. In a camera, in combination, a shutter driving ring turnable in a given plane and having a projection located in said plane and turnable with said ring; retarding means including a lever turnable about an axis perpendicular to said plane and having a free end portion located adjacent said projection of said ring; a pin slidably carried by said free end portion of said lever for movement parallel to the turning axis thereof and located in the path of movement of said projection of said ring; and spring means cooperating with said pin for urging the latter toward said plane in which said ring and said projection turn, said pin and said projection having slidable engagement with each other during turning of said ring preparatory to driving a shutter of the camera to make the exposure and at the end of said preparatory movement said pin snapping under the action of said spring means behind an edge of said projection for placing the retarding means in operative engagement with said driving ring.

9. In a camera, in combination, a shutter driving ring turnable in a given plane and having a projection located in said plane and turnable with said ring; retarding means including a lever turnable about an axis perpendicular to said plane and having a free end portion located adjacent said projection of said ring; a pin slidably carried by said free end portion of said lever for movement parallel to the turning axis thereof and located in the path of movement of said projection of said ring; and spring means cooperating with said pin for urging the latter toward said plane in which said ring and said projection turn, said pin and said projection having slidable engagement with each other during turning of said ring preparatory to driving a shutter of the camera to make the exposure and at the end of said preparatory movement said pin snapping under the action of said spring means behind an edge of said projection for placing the retarding means in operative engagement with said driving ring, said pin and projection respectively having surface portions which engage each other during the initial engagement between said pin and projection and one of said surface portions being inclined with respect to the other to facilitate the slidable engagement between said pin and said projection.

References Cited by the Examiner
UNITED STATES PATENTS
2,785,612   3/57   Singer _____ 95—63

JOHN M. HORAN, *Primary Examiner.*
NORTON ANSHER, *Examiner.*